United States Patent [19]
Takigawa et al.

[11] Patent Number: 6,091,695
[45] Date of Patent: Jul. 18, 2000

[54] RECORDING/REPRODUCING DEVICE HAVING POSITIONING MECHANISM FOR VERTICALLY MOVABLE PICKUP UNIT

[75] Inventors: Makito Takigawa; Shinichi Higuchi, both of Fukushima-ken, Japan

[73] Assignee: Alps Electric Co., Ltd., Japan

[21] Appl. No.: 09/088,837

[22] Filed: Jun. 2, 1998

[30] Foreign Application Priority Data

Jun. 2, 1997 [JP] Japan ................................. 9-144063

[51] Int. Cl.[7] ............................................... G11B 17/22
[52] U.S. Cl. ......................................................... 369/178
[58] Field of Search ............................. 369/36, 178, 191, 369/192; 360/98.04–98.06

[56] References Cited

U.S. PATENT DOCUMENTS

| | | | |
|---|---|---|---|
| 4,611,155 | 9/1986 | Kurakake | 318/603 |
| 4,797,865 | 1/1989 | Imai et al. | 369/36 |
| 4,969,138 | 11/1990 | Ikedo et al. | 369/36 |
| 5,327,412 | 7/1994 | Lee | 369/75.2 |
| 5,777,956 | 7/1998 | Nakamichi | 369/36 |
| 5,802,021 | 9/1998 | Mukaida | 369/34 |
| 5,862,012 | 1/1999 | Tsuchiya | 360/99.02 |
| 5,917,787 | 6/1999 | Tsuchiya et al. | 369/36 |
| 5,933,403 | 8/1999 | Kim et al. | 369/191 |

FOREIGN PATENT DOCUMENTS

WO 94/12980  6/1994  WIPO .

*Primary Examiner*—Brian E. Miller
*Attorney, Agent, or Firm*—Brinks, Hofer, Gilson & Lione

[57] ABSTRACT

According to this invention, a recording/reproducing device includes a DC motor for driving cam plates in the horizontal direction, a sensor for detecting positions of the cam plates in the horizontal direction, and a horizontal cam groove portion which is formed on at least one end portion of the cam grooves and with which the cam pins of the pickup unit are brought into contact. The cam plates are driven in the horizontal direction by the DC motor, the cam pins of the pickup unit are brought into contact with the horizontal cam groove portion, and, at this time, initialization of the cam plates is performed by causing the sensor to detect the positions of the cam plates in the horizontal direction.

6 Claims, 9 Drawing Sheets

RECORDING/REPRODUCING DEVICE HAVING POSITIONING MECHANISM FOR VERTICALLY MOVABLE PICKUP UNIT

BACKGROUND OF THE INVENTION

1. Field of the Invention

The present invention relates to a recording/reproducing device, having a pickup unit having a head mounted thereon, for selecting a desired disk from a magazine which accommodates a plurality of disks therein to read or write data or read and write data between the selected disk and the head.

2. Description of the Related Art

In general, a recording/reproducing device, i.e., a CD-ROM changer is designed to be able to insert/discharge a magazine which accommodates a plurality of recording media therein into/from an insertion port.

In the CD-ROM changer, a disk selected from a plurality of CD-ROMs (disk-like recording media: to be referred to as disks hereinafter) in the inserted magazine is moved into a pickup unit (or in the reverse direction in a discharge state) such that the drive force of a motor is reduced by a gear train to drive a tray loading mechanism.

Figure 10:
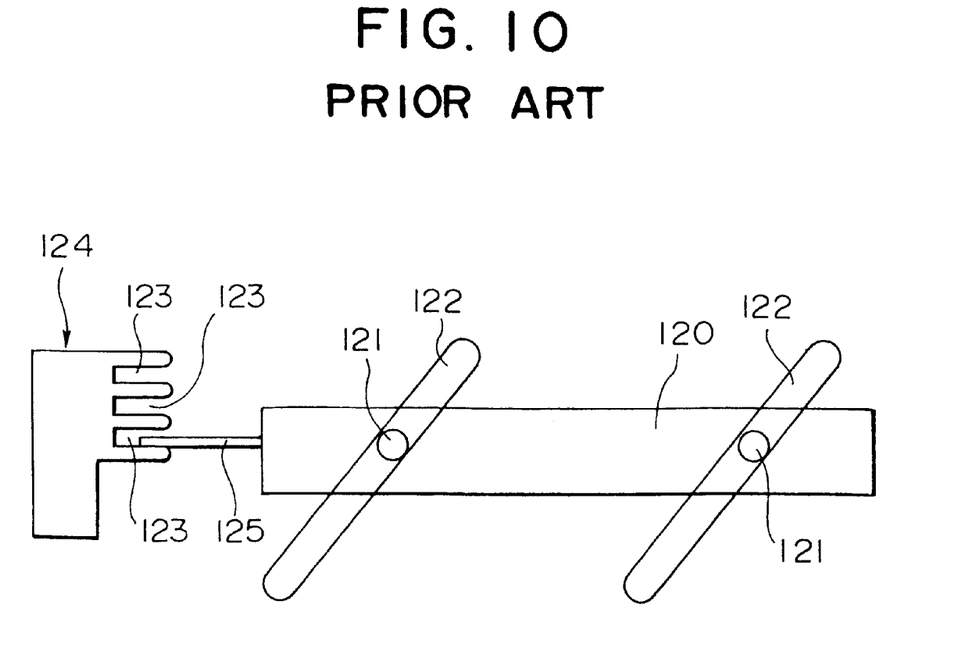
FIG. 10 is a side view showing a conventional positioning mechanism.
Figure 11:
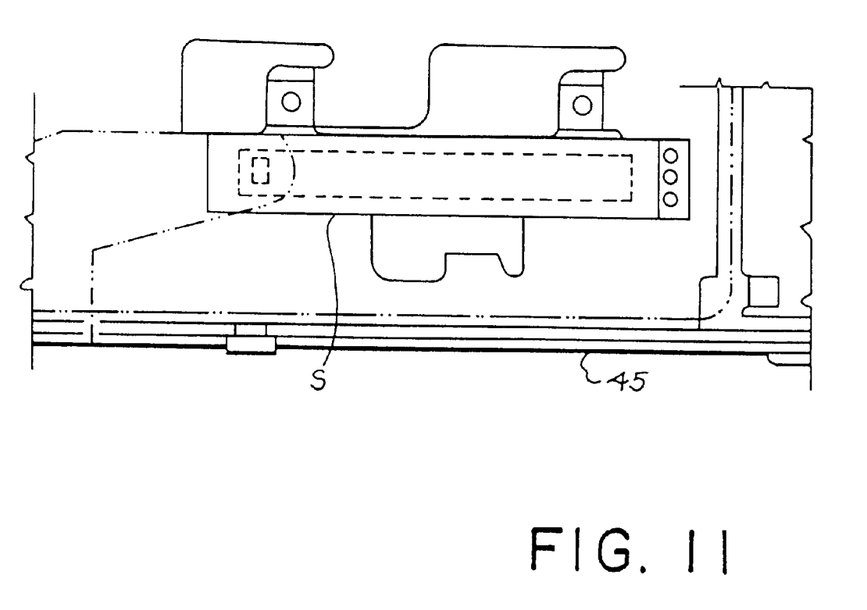
FIG. 11 is a side view showing the sensor of the present invention.

In this case, the pickup unit is elevated to the stage (level) of the selected disk by a level-positioning mechanism to be stopped at the stage. FIG. 10 is a view for explaining the outline of a conventional level-positioning mechanism.

A pickup unit 120 having a head (not shown) mounted thereon is arranged in the housing of a CD-ROM chamber. The pickup unit 120 is elevated by a level-positioning mechanism to be positioned at a predetermined level. The level-positioning mechanism, as shown in FIG. 10, has a cam plate having inclined guide groove portions 122 to which pins 121 projecting from both the side surfaces of the pickup unit 120 are guided, and a comb-like positioning member 124 in which positioning slits 123 are formed such that the number of slits 123 is equal to the number of disks.

When a desired disk is selected from the magazine which accommodates a plurality of disks therein, a motor (not shown) is driven to slide a cam plate to the right or left, and the pins 121 move along the guide groove portions 122, so that the pickup unit 120 is moved upward or downward. For example, if the lowermost disk is selected, as shown in FIG. 10, the motor is stopped at the level of the lowermost slit 123. Thereafter, a level determination pawl 125 which is drawn in the pickup unit 120 is inserted into the lowermost slit 123 by a level determination pawl projection mechanism (not shown). Thereafter, the positioning member 124 is slightly moved upward to put the lower surface of the level determination pawl 125 on the edge portion of the lower side of the lowermost slit 123. In this manner, the level of the pickup unit 120 on the lowermost stage is determined.

The disk on the lowermost stage is moved into the pickup unit by a tray loading mechanism, so that data is read/written between the disk and the head.

In the above prior art, after the pickup unit 120 is moved to a position near the position having a predetermined level by the cam plate having the inclined guide groove portions 122, the level determination pawl 125 is inserted into the comb-like positioning member 124, the level of the pickup unit 120 is determined on each stage selected in such a manner that the positioning member 124 is pushed up by the guide groove portions 122 of the cam plate. For this reason, a projection mechanism for the level determination pawl 125, a push-up mechanism for the comb-like positioning member 124, and the like are required to make the mechanisms complex, thereby increasing probability of an increase in cost and probability of fault. In addition, since the level determination pawl projection mechanism and the positioning member 124 in the pickup unit 120 are required, the device cannot be easily made compact. The level determination pawl projecting operation and the push-up operation of the positioning member 124 must be performed, and a period of time from the selecting operation to the loading operation is long.

SUMMARY OF THE INVENTION

It is the first problem of the present invention to provide a recording/reproducing device which can keep the level precision of a pickup unit by causing a sensor to detect a horizontal position of a cam plate without parts such as a conventional level-positioning member and in which a simple mechanism is simplified, probability of an increase in cost and probability of fault can be reduced, a compact body can be accomplished, and a projection moving operation and a push-up operation for a positioning member are not required, so that a period of time from a selecting operation to a loading operation can be shortened.

It is the second problem of the present invention to provide a recording/reproducing device which can keep the level precision of a pickup unit by causing a sensor to detect a level position of the pickup unit without parts such as a conventional level-positioning member and in which a mechanism is simplified, probability of an increase in cost and probability of fault can be reduced, a compact body can be accomplished, and a projection moving operation and a push-up operation for a positioning member are not required, so that a period of time from a selecting operation to a loading operation can be shortened.

It is the third problem of the present invention to provide a recording/reproducing device in which defective level-position precision caused by overrunning of elevation can be prevented even after a drive motor is stopped, and an entire moving time can be prevented from being considerably shortened.

It is the fourth problem of the present invention to provide a recording/reproducing device in which, when the pickup unit is stopped at a lower stop position or an upper stop position, the influence of hysteresis can be eliminated, or even if hysteresis is generated, the same condition can be set, and the pickup unit can be stopped at the same stop position.

It is the fifth problem of the present invention to provide a recording/reproducing device in which a cam pin is held at a crossing point between a longitudinal groove and an inclined cam groove portion by a wedge-like corner portion constituted by the inclined surface of the cam groove and the vertical surface of the longitudinal groove to make the cam pin stable, thereby preventing vibration.

The first problem is solved by the first means which is a recording/reproducing device, having a pickup unit having a head mounted thereon, for selecting a desired disk from a magazine which accommodates a plurality of disks therein to read/write data between the selected disk and the head, comprising: a cam plate which has a cam groove engaged with a cam pin of the pickup unit to vertically move the pickup unit and is supported movably in a horizontal direction; a motor for driving the cam plate in the horizontal direction; a sensor for detecting a position of the cam plate in the horizontal direction; and a horizontal position reference portion which is formed on at least one end portion of the cam groove and with which the cam pin of the pickup unit is brought into contact, wherein the cam plate is driven in the horizontal direction by the motor, the cam pin of the pickup unit is brought into contact with the horizontal position reference portion, and, at this time, initialization of the cam plate is performed by causing the sensor to detect the position of the cam plate in the horizontal direction.

The second problem is solved by the second means which is a recording/reproducing device, having a pickup unit having a head mounted thereon, for selecting a desired disk from a magazine which accommodates a plurality of disks therein to read/write data between the selected disk and the head, comprising: a cam plate which has a cam groove engaged with a cam pin of the pickup unit to vertically move the pickup unit and is supported movably in a horizontal direction; a motor for driving the cam plate in the horizontal direction; a sensor for detecting a level position of the pickup unit; and a horizontal position reference portion which is formed on at least one end portion of the cam groove and with which the cam pin of the pickup unit is brought into contact, wherein the cam plate is driven in the horizontal direction by the motor, the cam pin of the pickup unit is brought into contact with the horizontal position reference portion, and, at this time, initialization of the cam plate is performed by causing the sensor to detect the level position of the pickup unit.

The third problem is solved by the third means in which, in the first and second means, the motor drives the cam plate at a first speed until the difference between an output value from the sensor and a target value is equal to a first predetermined value, thereafter, the motor drives the cam plate at a second speed lower then the first speed until the difference between the output value from the sensor and the target value is equal to a second predetermined value smaller than the first predetermined value, and, thereafter, driving of the cam plate is stopped when the difference between the output value from the sensor and the target value reaches a third predetermined value smaller than the second predetermined value.

The fourth problem is solved by the fourth means in which, in the first and second means, when the pickup unit is moved downward to be stopped at a position corresponding to a target value, after the pickup unit is temporarily caused to pass through the position corresponding to the target value, the pickup unit is moved upward to be stopped at the position corresponding to the target value.

The fifth problem is solved by the fifth means in which, in the first and second means, the cam groove is engaged with the cam pin projecting from the pickup unit and engaged with the cam pin at the inclined portion of the cam groove even at a level position where any disk is selected.

DESCRIPTION OF THE EMBODIMENT

An embodiment of the present invention will be described below.

Figure 1:
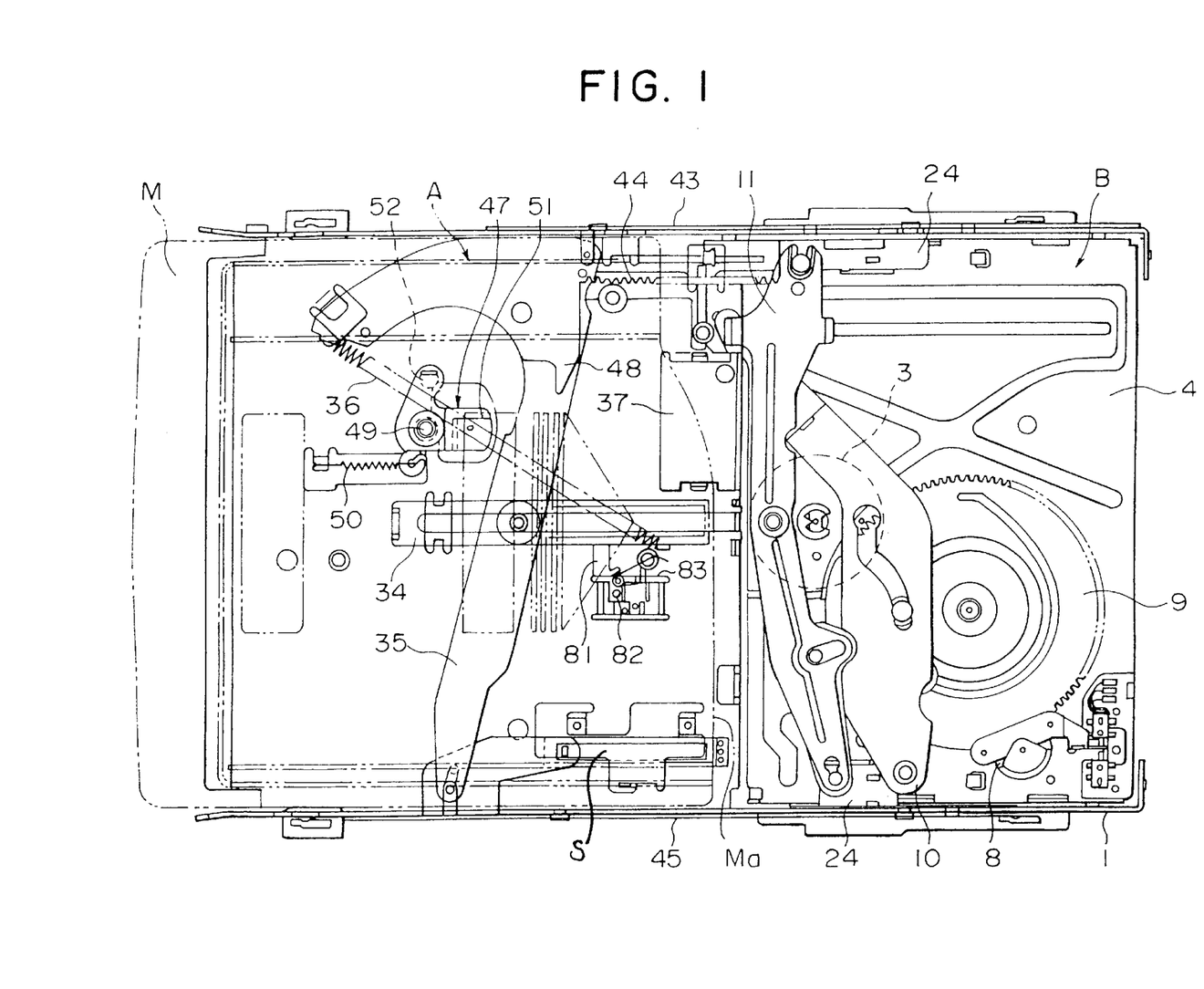
FIG. 1 is a plan view of a CD-ROM changer to which an embodiment of a recording/reproducing device according to the present invention is applied.
Figure 2:
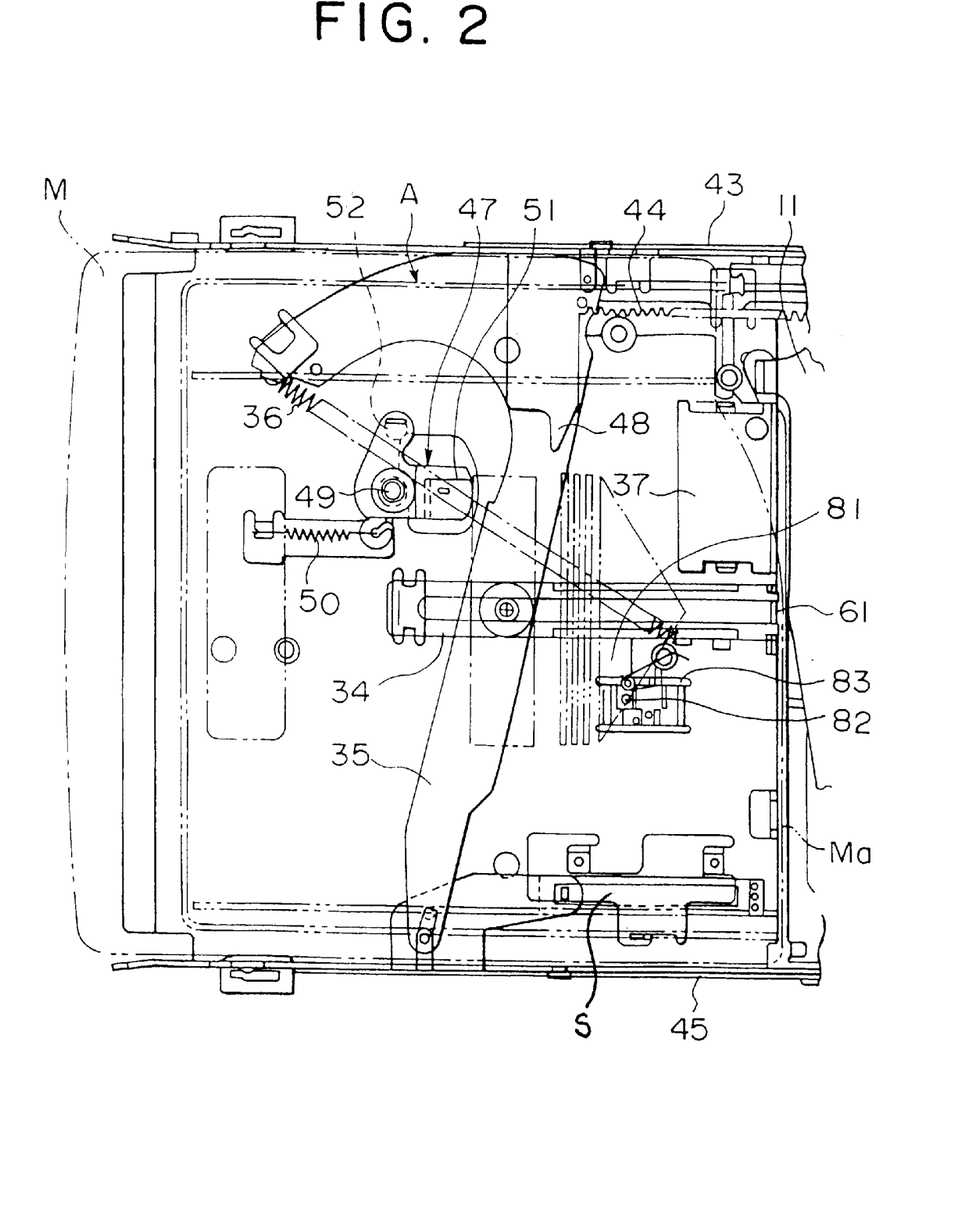
FIG. 2 is a view for explaining a magazine loading completion state.
Figure 3:
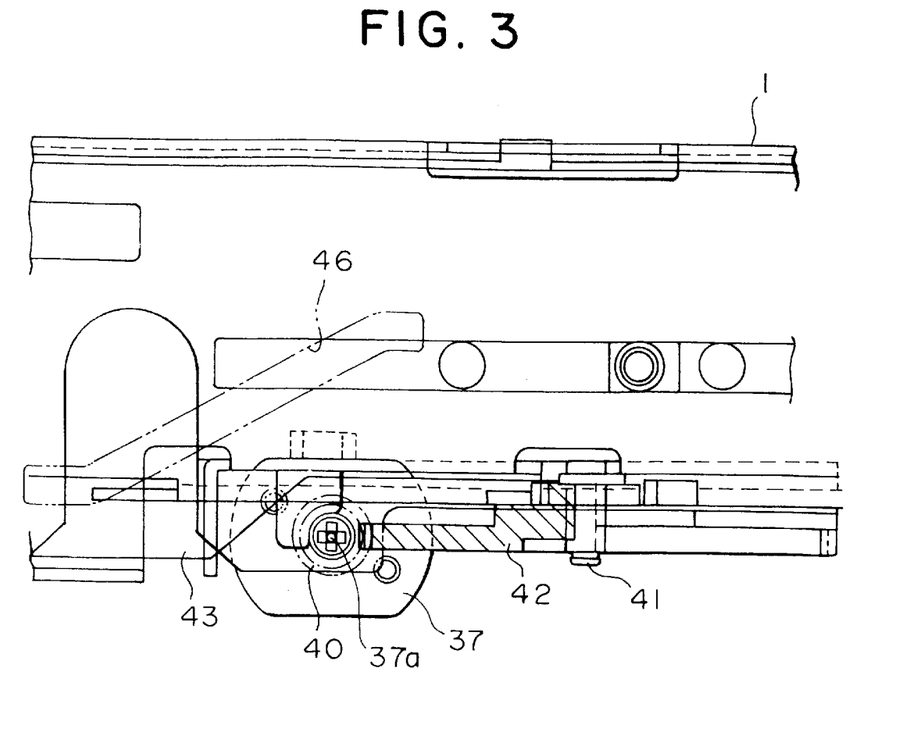
FIG. 3 is an enlarged plan view showing a motor portion for elevating a pickup unit and for ejecting a magazine.
Figure 4:
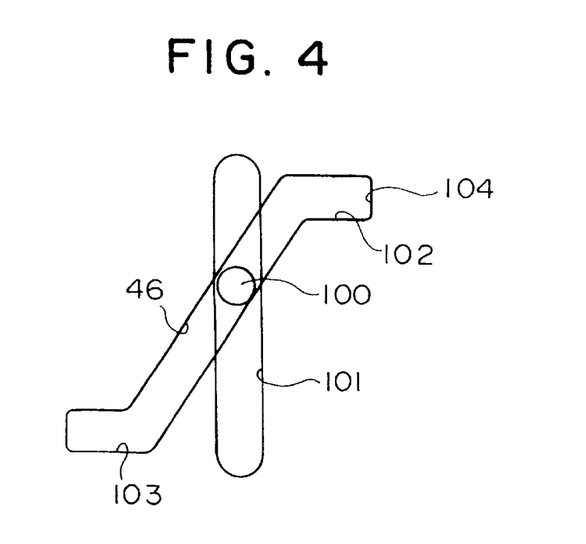
FIG. 4 is a view for explaining a typical relationship among a cam pin, a vertical groove, and a cam groove.
Figure 5A:
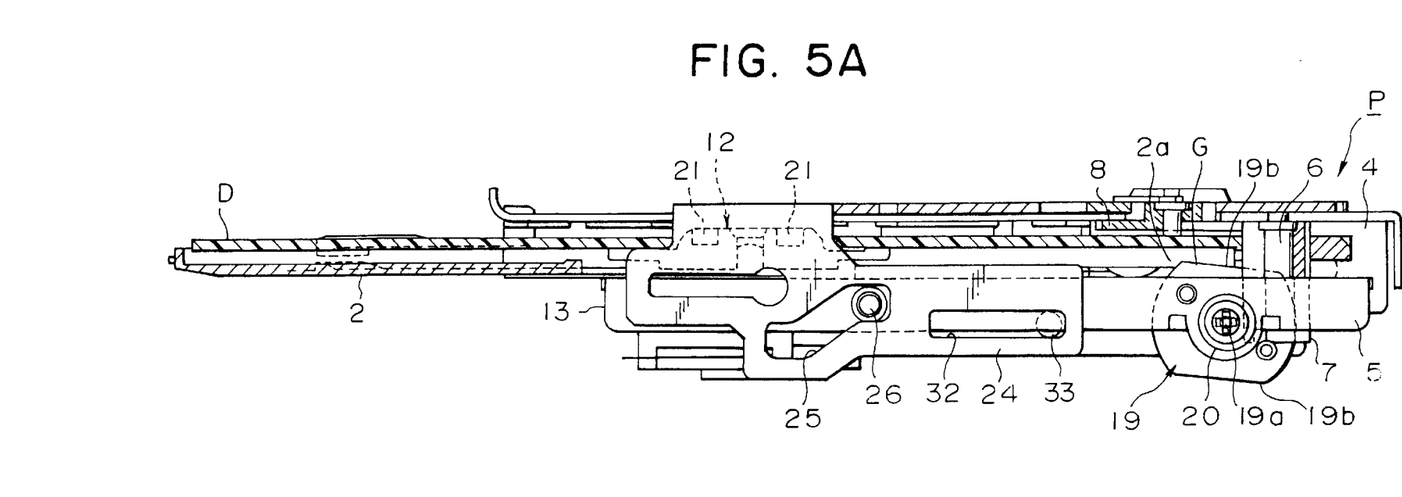
FIGS. 5A and 5B are views for explaining open and closed states of a pickup unit of the CD-ROM changer.
Figure 5B:
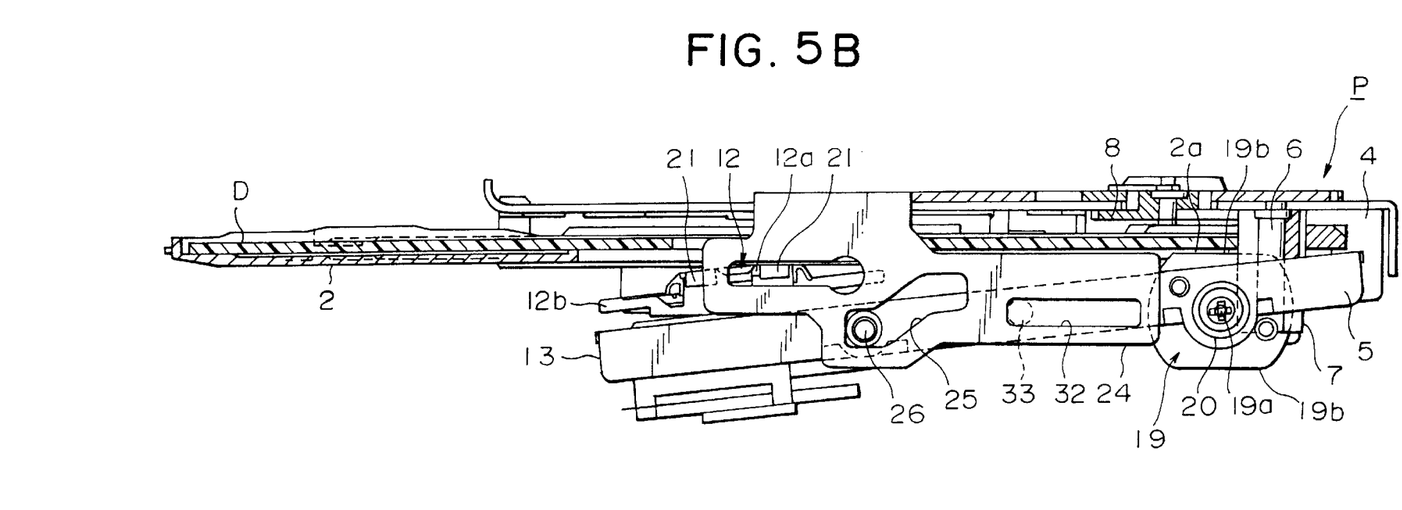
Figure 6:
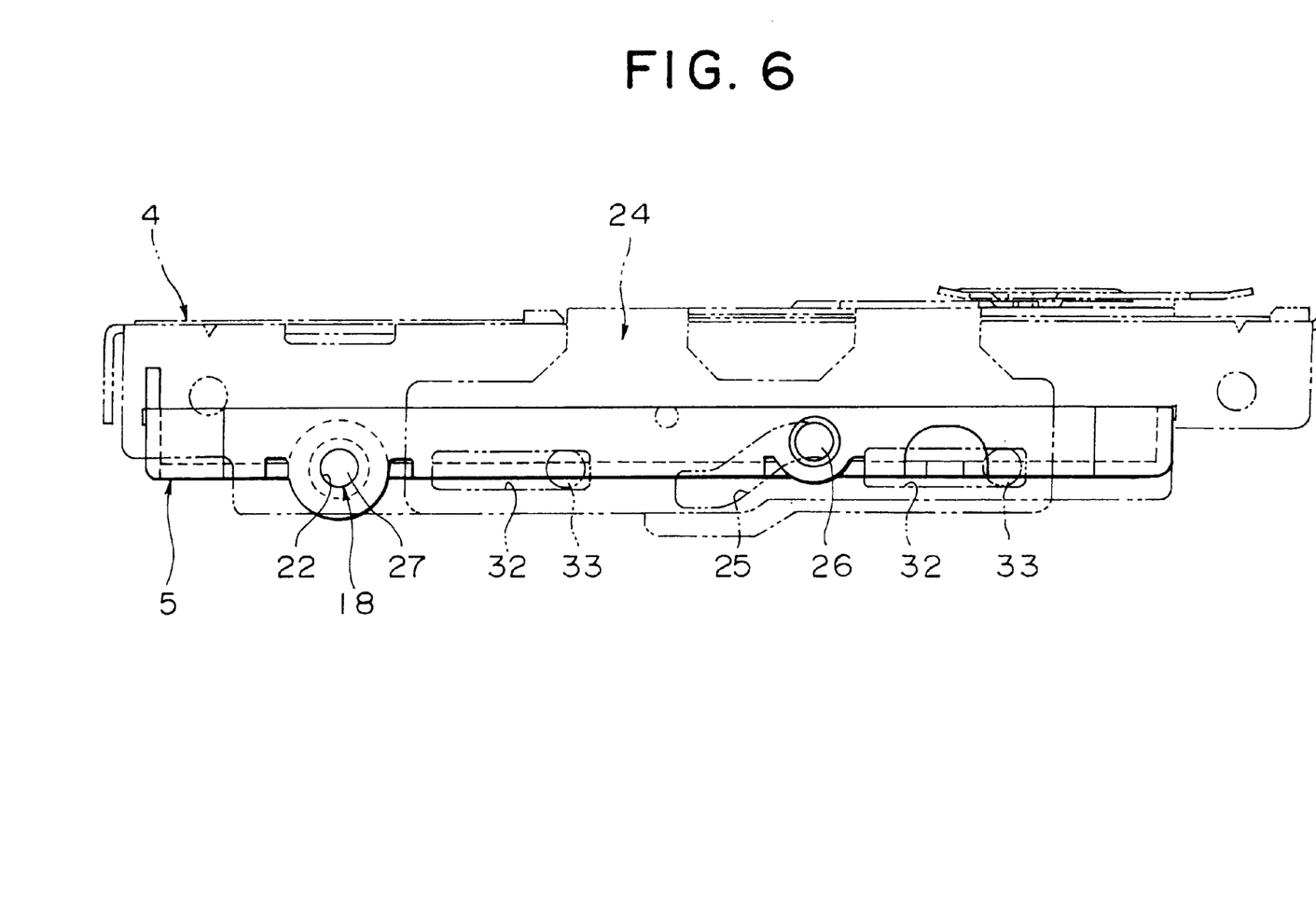
FIG. 6 is a side view of a pickup unit.
Figure 7:
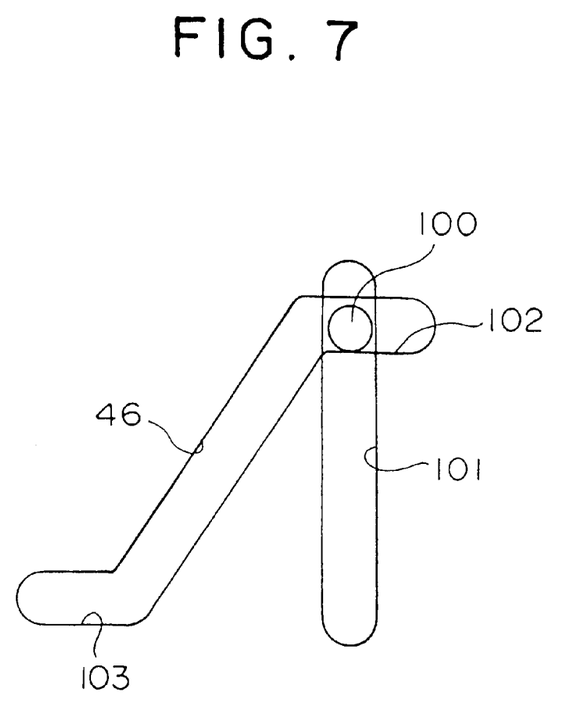
FIG. 7 is a view for explaining another cam groove.
Figure 8:
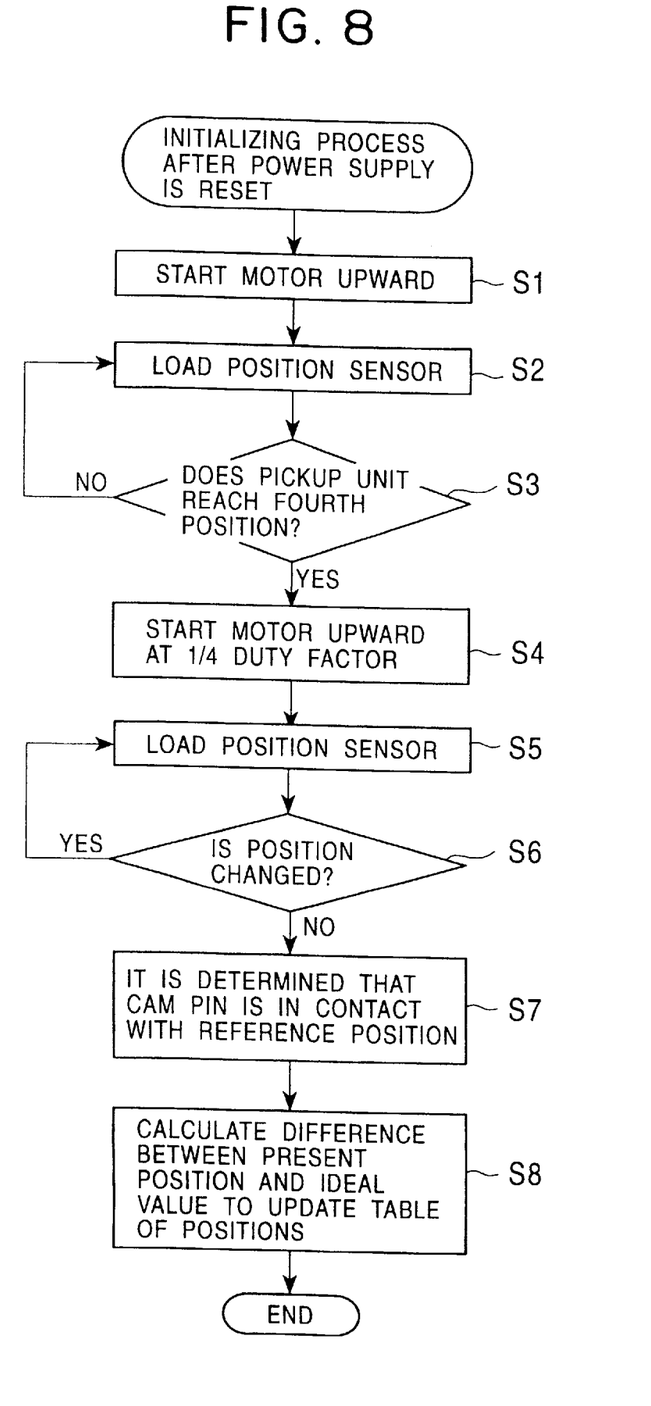
FIG. 8 is a flow chart showing initializing process control.
Figure 9:
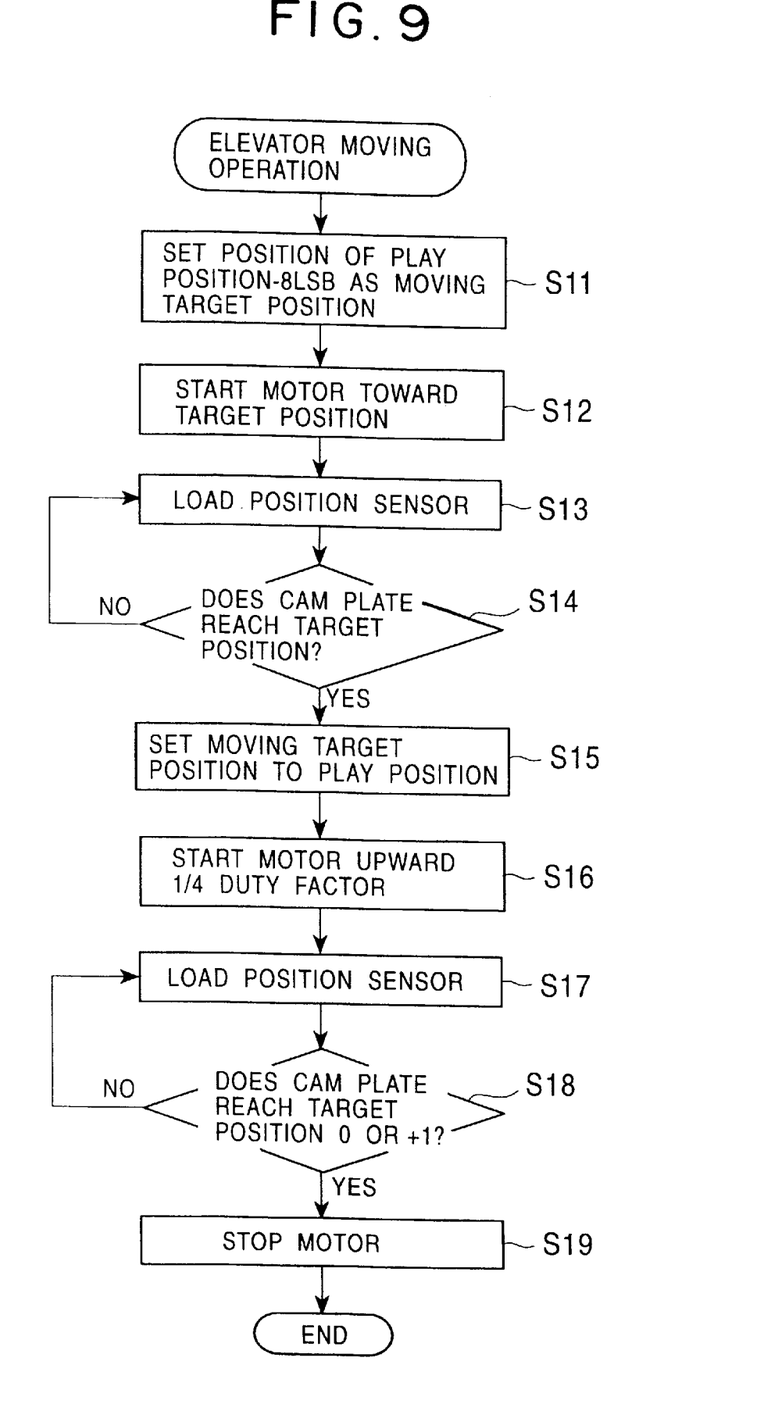
FIG. 9 is a flow chart showing elevating operation control.

FIG. 1 is a plan view of a CD-ROM changer to which an embodiment of a recording/reproducing device according to the present invention is applied; FIG. 2 is a view for explaining a magazine loading completion state; FIG. 3 is an enlarged plan view showing a motor portion for elevating a pickup unit and for ejection; FIG. 4 is a view for explaining a typical relationship among a cam pin, a vertical groove, and a cam groove; FIGS. 5A and 5B are views for explaining open and closed states of a pickup unit of the CD-ROM changer; FIG. 6 is a side view of a pickup unit; FIG. 7 is a view for explaining another cam groove; FIG. 8 is a flow chart showing initializing process control; and FIG. 9 is a flow chart showing elevating operation control.

Referring to these drawings, reference numeral 1 denotes a housing. This housing 1 has a box-like shape, and, as shown in FIG. 1, a disk installation section A and a mechanism section B are arranged in the housing 1. A magazine M is loaded on the disk installation section A from the left in FIG. 1. The magazine M uses a tray scheme, and the right side of the magazine M in FIG. 1 serves as an ejection port Ma for a disk D.

In this CD-ROM changer, a tray 2 selected from a plurality of trays 2 in the magazine M loaded on the disk installation section A is drawn halfway and clamped in a disk selective drive section in the mechanism section B. A CD-ROM (to be referred to as a disk hereinafter) D is rotated and driven while the disk is partially left in the magazine M.

The mechanism section B comprises a tray chassis 4 on which a disk-pressure clamper 3 is arranged and a pickup chassis 5 located under the tray chassis 4 and pivotally supported by the tray chassis 4. A pickup unit P constituted by the tray chassis 4 and the pickup chassis 5 is guided in the mechanism section B of the housing 1 such that the pickup unit P can be elevated (elevator moved) in a vertical direction (direction perpendicular to the paper surface of FIG. 1). Reference numeral 34 denotes a magazine eject member; 35, an elevating link for the pickup unit P; 36, an eject spring; and 37, a DC motor for driving the elevating link 35.

In the tray chassis 4, the disk-pressure clamper 3 to chuck the disk D placed on the trays 2, an intermediate gear 7 pivotally supported by a support shaft 6 extending downward from the tray chassis 4, a drive force transmission gear constituted by gears 8 and the like engaged with the intermediate gear 7, a cam gear 9 driven by the drive force transmission gear, a tray convey arm 10 for causing the cam gear 9 to draw or push the tray 2, and an opening/closing lever 11 for performing an opening/closing operation for the pickup chassis 5 with respect to the tray chassis 4.

On the pickup chassis 5, as shown in FIG. 5, a turntable 12 on which a disk is placed to rotate and drive the disk, and a spindle motor 13 having a drive shaft to which the turntable 12 is fixed are mounted. On the pickup chassis 5, although not shown, a carriage conveyed in the radial direction of the disk is arranged. A head for reading/writing information of the disk is mounted on the carriage.

On the lower portion of the tray chassis 4, the pickup chassis 5 is supported by a pivotal shaft 18 at one end portion (on the right side in FIG. 5) such that the pickup chassis 5 can be pivoted. A DC motor 19 for loading a tray is mounted on the pickup chassis 5 such that the shaft core of a drive shaft 19a is arranged coaxially with the shaft core of the pivotal shaft 18. A worm gear 20 is fitted on and fixed to the drive shaft 19a of the DC motor 19, and the intermediate gear 7 rotatably supported by the support shaft 6 extending downward from the above-mentioned tray chassis 4 arranged above the trays 2 is meshed with the worm gear 20. The intermediate gear 7 is meshed with the drive force transmission gear constituted by the gears 8 and the like shown in FIGS. 5A and 5B. The intermediate gear 7 rotates the cam gear 9 to drive a tray loading mechanism constituted by the tray convey arm 10 and the like, thereby loading the tray 2.

Pickup cam plates 24 are slidably supported by the tray chassis 4. More specifically, the pickup cam plates 24 are slidably guided by guide pins 33 and the like of the tray chassis 4 inserted into guide splits 32 formed in the pickup cam plates 24. These pickup cam plates 24 are driven by the opening/closing lever 11 interlocked with the cam gear 9 driven by the DC motor 19. Cam grooves 25 in which pickup cam pins 26 are inserted are formed in the pickup cam plates 24 such that the cam grooves 25 are reversely inclined.

With respect to the tray chassis 4, the pickup chassis 5 is pivotally supported about pivotal pins 27 constituting the pivotal shaft 18. The pickup cam pins 26 are moved in the cam grooves 25 by the slide operation of the pickup cam plates 24 of the tray chassis 4 to set the pickup chassis 5 in an open state shown in FIG. 5B and a closed state shown in FIG. 5A and FIG. 6.

Flat surfaces 19b which are parallel to each other are formed on the outer surface of the body of the DC motor 19. The DC motor 19, as shown in FIG. 5B, is attached to the pickup chassis 5 in such a manner that the flat surfaces 19b are parallel to the lower surface of the tray 2 to be inserted when the pickup chassis 5 and the tray chasss 4 are set in an open state.

As shown in FIG. 5B, when the pickup chassis 5 is set in an open state, and a tray 2 selected from the magazine M is tray-loaded by the tray convey arm 10 to be accommodated in the mechanism section B, the DC motor 19 of the pickup chassis 5 is set to be parallel to the lower surface of the inserted tray 2. For this reason, a clearance is assured between the tray 2 or the disk D in the tray 2 and the outer surface (flat surfaces 19b) of the body of the DC motor 19, and the tray 2 and the disk D can be inserted without being brought into contact with the outer surface of the body of the DC motor 19. Reference numeral 2a denotes an opening formed in the bottom surface of the tray 2. The disk D is exposed from the opening 2a.

In the turntable 12, a projection portion 12a having a trapezoidal section is formed at the central portion, and a flange portion 12b is formed at the outer peripheral portion. A magnet 21 is arranged on the projection portion 12a to be opposite to the magnetic portion of the disk-pressure clamper 3. Therefore, in a chucking state shown in FIG. 5A, the magnet 21 adsorbs the magnetic portion of the disk-pressure clamper 3 by magnetic force of the magnet 21 of the turntable 12 to hold the disk D between the magnet 21 and the clamper 3 and to chuck the disk D, so that the disk D is rotated together with the turntable 12.

The above-mentioned DC motor 37 and a magazine eject mechanism and an elevating mechanism for the pickup unit P which are driven by the DC motor 37 will be described below.

The DC motor 37 is attached to the bottom plate of the housing 1 as shown in FIGS. 1 and 3, and a worm gear 40 is fitted on and fixed to a drive shaft 37a of the DC motor 37. The large-tooth portion of an intermediate gear 42 pivotally supported by a support shaft 41 extending from the bottom plate of the housing 1 is meshed with the worm gear 40, and the small-tooth portion of the intermediate gear 42 is meshed with a rack portion 44 of a cam plate 43.

The cam plate 43 is slidably supported by one of the side plates of the housing 1, and a cam plate 45 is slidably supported by the other of the side plates of the housing 1. The cam plates 43 and 45 are connected to the elevating link 35 through a pin 38 and a long hole 39, and are pivotally supported by the central portion of the elevating link 35. For this reason, when the cam plate 43 is slid by the DC motor 37 in, e.g., the left direction in FIG. 1, the elevating link 35 is pivoted about the central portion of the elevating link 35 in the counterclockwise direction to slide the cam plate 45 in the right direction in FIG. 1. When the pickup unit P is moved to the level of the selected tray 2 by an elevation positioning mechanism (to be described later) to be positioned, and the tray 2 in the magazine M is drawn into the open pickup unit P by the above-mentioned tray loading mechanism, the state shown in FIG. 5B is set.

With the sliding operation of the cam plates 43 and 45, pins 100 on the side surfaces of the pickup unit P are elevated by inclined cam groove portions 46 inclined in the direction opposite to the direction of the cam plates 43 and 45, thereby elevating the pickup unit P.

The elevation positioning mechanism for the pickup unit will be described below.

The elevation positioning mechanism has the above-mentioned cam plates 43 and 45. As shown in FIGS. 1, 3, and 4, the two inclined cam groove portions 46 inclined in the direction opposite to the direction of the cam plates 43 and 45 are formed in each of the cam plates 43 and 45. The pins 100 of the side surfaces of the pickup unit P are engaged with the inclined cam groove portions 46, and the pins 100 are inserted in longitudinal grooves 101 formed in the housing 1 to be guided in the vertical direction. Therefore, with the movement of the inclined cam groove portions 46 caused by the sliding operation of the cam plates 43 and 45, the pickup unit P is elevated through the pins 100.

An example of the elevation positioning mechanism will be described below with reference to FIG. 7.

FIG. 7 shows one set of the pin 100, the inclined cam groove portion 46, and the longitudinal groove 101. In this embodiment, a total of four sets are arranged.

In the example shown in FIG. 7, horizontal cam groove portions 102 and 103 are formed to be connected to the upper and lower ends of the inclined cam groove portions 46. As described above, the sliding operation cam plates 43 and 45 is performed by the DC motor 37 to move the inclined cam groove portions 46, so that the pins 100 are vertically moved along the longitudinal grooves 101 while the pins 100 move in the inclined cam groove portions 46. In this manner, the pickup unit P is elevated together with the pins 100. A cam groove is constituted by the inclined cam groove portion 46 and the horizontal cam groove portions 102 and 103.

For example, in an elevation positioning operation performed to the magazine M in which four disks D are accommodated, a level position of the pickup unit P when the disk D on the upper most stage (the fourth) is selected is set to the upper horizontal cam groove portion 102, a level position of the pickup unit P when the disk D on the lower most stage (the first) is selected is set to the lower horizontal cam groove portion 103, and level positions of the pickup unit P when the second and third disks D are selected are set to positions in the inclined cam groove portion 46.

In the CD-ROM changer or the like of this type, high-speed reading is performed at a 12× speed or the like. In this case, the disk is vibrated by mass eccentricity of the disk, the pickup unit P is vibrated as a whole, and reading characteristics are degraded.

Since this vibration is generated by the rotation of the disk, the vibration has a horizontal direction. However, in the example shown in FIG. 7, when the cam pin 100 is held by the horizontal cam groove portion 102 or 103, a gap is formed between the cam pin 100 and both the edges of the longitudinal groove 101. For this reason, the cam pin 100 cannot be prevented from being horizontally vibrated.

As a means for solving the above problem, another example of the elevation positioning mechanism shown in FIG. 4 will be described below. Note that another example is applied to the CD-ROM changer shown in FIGS. 1, 3, 5, and the like.

In this example shown in FIG. 4, the horizontal cam groove portions 102 and 103 are formed to be connected to the upper and lower ends of the inclined cam groove portion 46 as in the example shown in FIG. 7. As described above, the cam plates 43 and 45 are slidably operated in the reverse direction by the DC motor 37 through the elevating link 35 to move the inclined cam groove portions 46, so that the cam pins 100 are vertically moved along the longitudinal grooves 101 while moving in the inclined cam groove portions 46. In this manner, elevation of the pickup unit P is performed together with the cam pins 100.

This example is different from the example shown in FIG. 7 in the following point. That is, in elevation positioning performed to the magazine M in which four disks D are accommodated, even if any one of the first, second, third, and fourth disks D is selected, the level position of the pickup unit P is set in the inclined cam groove portion 46. More specifically, the inclined cam groove portion 46 is engaged with the cam pin 100 extending from the pickup unit P, and the inclined cam groove portion 46 is engaged with the cam pin 100 at the inclined portion of the inclined cam groove portion 46 even if a level position obtained when any disk D is selected is set.

With this arrangement shown in FIG. 4, the cam pin 100 is held at the crossing point between the longitudinal groove 101 and the inclined cam groove portion 46 by a wedge-like corner portion constituted by the inclined surface of the cam groove portion 46 and the vertical surface of the longitudinal groove 101 to make the cam pin 100 stable, thereby preventing the cam pin 100 from being horizontally vibrated. In this example, although tray loading for the disk D in the magazine M is not performed by the horizontal cam groove portions 102 and 103, the horizontal cam groove portions 102 and 103 are used in an initializing operation (to be described later).

Although the level precision of the pickup unit P to which an elevation operation is performed is considerably dependent on the relationship (precision) between the position of a linear position sensor S and the position of the cam groove, this positional relationship is changed by initial assembly precision based on an error or an assembly error in manufacturing parts and variations in precision in repeated use. In order to prevent this, a position adjustment mechanism using a screw is arranged in a conventional device to correct the initial assembly precision. However, the device does not cope with the variations caused by the change in precision in repeated use.

In this embodiment, a position reference surface 104 is formed at the deep position of the upper horizontal cam groove portion 102 of the cam groove (only the upper horizontal cam groove portion 102 of one cam groove of the four cam grooves), the cam pin 100 is brought into contact with the reference surface 104 when the power supply of the CD-ROM changer is turned on. A detection output from the linear position sensor S obtained when the cam pin 100 is brought into contact with the reference surface 104 is subjected to sampling, and the resultant value is used as a reference value for elevation (elevator movement) operation control, thereby correcting the initial assembly precision (initializing control shown in FIG. 8 to be described later). With this initializing control, not only correction of initial assembly precision but also variation in precision in unexpected repeated use can be performed.

When one cam pin 100 is brought into contact with the position reference surface 104 in the initializing process, the other cam pins 100 are set not to be brought into contact with the ends of the horizontal cam groove portions 102 and 103. In this manner, a positional reference is always set at one position, and stable initialization can be performed.

A lock releasing cam portion 48 for releasing a lock member 47 which locks the loaded magazine M is arranged on the magazine insertion port of the rack portion 44 of the cam plate 43. The lock member 47 is pivotally supported by a shaft 49 on the housing 1, and is urged by a coil spring 50 in the clockwise direction in FIGS. 1 and 2. A lock portion 51 engaged with a locking projection (not shown) extending from the upper surface of the magazine M to lock the magazine M and an engagement pin 52 engaged with the lock releasing cam portion 48 are arranged on the lock member 47. An inclined surface 51a which is brought into contact with the locking projection (not shown) in insertion of the magazine M and a lock surface portion 51b engaged with the locking projection (not shown) are formed on the lock portion 51.

By the sliding of the cam plate 43 in the left direction in FIG. 1 as described above, the lock releasing cam portion 48 is engaged with the engagement pin 52 of the lock member 47 to pivot the lock member 47 counterclockwise against the coil spring 50, the locking projection (not shown) of the magazine M is released to eject the magazine M in the left direction in FIG. 1 by the spring force of the eject spring 36 which urges the magazine eject member 34 in the eject direction.

The eject spring 36 has one end which is hung on the magazine eject member 34, and the other end is hung on the elevating link 35. Since the elevating link 35 is urged by the spring force of the eject spring 36 in the clockwise direction in FIG. 1, i.e., since the spring force of the eject spring 36 has a direction in which the pickup unit P is moved upward, although drive force required for moving the pickup unit P upwardly is stronger than that required for moving the pickup unit P downwardly, these drive forces are made equal to each other.

An insert/eject operation of a magazine will be described below.

When the magazine M is inserted in the disk installation section A, the distal end of the magazine M slides the magazine eject member 34 against the spring force of the eject spring 36. With this insertion of the magazine M, the locking projection (not shown) of the magazine M is brought into contact with the inclined surface 51a of the lock member 47 to pivot the lock member 47 in the counterclockwise direction against the spring force of the coil spring 50 of the lock member 47. In addition, when the magazine M is inserted, the locking projection (not shown) of the magazine M gets over the inclined surface 51a of the lock member 47 to pivot the lock member 47 in the clockwise direction against the spring force of the coil spring 50, and the locking projection (not shown) is locked on the lock surface portion 51b of the lock portion 51. In this manner, by the magazine eject member 34 using the spring force of the eject spring 36, the magazine M is prevented from being ejected.

An eject button (not shown) is pressed to drive the DC motor 37, and the rack portion 44 of the cam plate 43 is slid in the left direction in FIG. 1 through the drive shaft 37a, the worm gear 40, and the intermediate gear 42. In this manner, the lock releasing cam portion 48 is also slid in the left direction in FIG. 1 to be engaged with the engagement pin 52 of the lock member 47, and the lock member 47 is pivoted in the counterclockwise direction against the coil spring 50. The lock surface portion 51b of the lock portion 51 is released from the locking projection (not shown) of the magazine M, and the magazine M is ejected in the left direction in FIG. 1 by the magazine eject member 34 using the spring force of the eject spring 36.

An operation piece 81 extends from the side edge of the magazine eject member 34, and a magazine detection switch 82 which is turned on (off) by pressing an actuator 83 with the operation piece 81 as shown in FIG. 2 is arranged on the bottom plate of the housing 1.

A tray selecting operation (elevation operation of the pickup unit P) in the magazine M will be described below.

When the magazine M is inserted into the deepest portion in the disk installation section A as described above, insertion of the magazine M is detected by a magazine detection switch (not shown). In this manner, a tray selecting operation for the tray 2 selected from the trays 2 in the magazine M is performed.

For example, when four trays 2 are accommodated in the magazine M, the second tray 2 from the top is selected, the DC motor 37 is driven to slide the rack portion 44 of the cam plate 43 in the right direction in FIG. 1 through the drive shaft 37a, the worm gear 40, and the intermediate gear 42, and the cam plate 45 interlocked with the elevating link 35 is slid in the left direction. In this manner, the pins 100 on the side surfaces of the pickup unit P are elevated by the inclined cam groove portions 46 of the cam plates 43 and 45 to move the pickup unit P upward to a level corresponding to the second tray 2. A tray loading operation is performed to move the second tray 2 in the magazine M into the pickup unit P.

When the disk D is to be changed, stopped, or ejected, the tray loading operation is performed to move the tray 2 in the pickup unit P into the magazine M.

When the eject button (not shown) is pressed, when all the trays 2 are not accommodated as described above, the tray loading operation is performed to accommodate all the trays 2 in the magazine M. Thereafter, the DC motor 37 is driven to slide the rack portion 44 of the cam plate 43 in the left direction in FIG. 1 through the drive shaft 37a, the worm gear 40, and the intermediate gear 42, and the cam plate 45 interlocked with the elevating link 35 is slid in the right direction to move the pickup unit P downward to the lowermost position. Thereafter, the DC motor 37 is further driven to pivot the elevating link 35 in the counterclockwise direction in FIG. 1, so that the above-mentioned ejecting operation (releasing of the lock member 47) for the magazine is performed.

The operation of the pickup unit P will be described below.

FIG. 5B in the following description shows a state in which a tray 2 is selected from a plurality of trays 2 in the magazine M, and a tray loading operation to draw the selected tray 2 into the mechanism section B.

In the state in FIG. 5B, the pickup chassis 5 is inclined and set in an open state such that the pickup cam plates 24 are slid by driving of the DC motor 19 from a position indicated by a two-dot chain line to a position indicated by a solid line to move the pickup cam pins 26 engaged with the cam grooves 25. At this time, the turntable 12 of the pickup chassis 5 is also located at the lowermost position to be separated from the disk-pressure clamper 3 (see FIG. 1), and the disk-pressure clamper 3 is adsorbed on the magnet (not shown) of the tray chassis 4 by the magnetic force of the magnet (not shown) of the tray chassis 4. Therefore, the disk-pressure damper 3 is located above the moving range of the tray 2 to be kept away from the moving range, and the turntable 12 is also located below the moving range of the tray 2 to be kept away from the moving range, so that the tray 2 can be inserted/removed into/from the position between the turntable 12 and the disk-pressure clamper 3 from the left side in FIG. 5B. In the state in FIG. 5B, since the turntable 12 is below the tray 2, the disk D is placed on the tray 2.

In the state in FIG. 5B, when the DC motor 19 is driven to slide the pickup cam plates 24 to a position indicated by a solid line in FIG. 5A, the pickup cam pins 26 move in the cam grooves 25 to move the pickup chassis 5 upward. With this operation, the turntable 12 of the pickup chassis 5 is also moved upward to be close to the disk-pressure clamper 3, and the disk D is chucked, so that the disk D is rotationally driven together with the turntable 12.

In this chucking operation, the disk D is lifted up from the tray 2 by the turntable 12 and separated from the tray 2 in a chucking completion state as shown in FIG. 5A.

With pivoting of the pickup chassis 5 about the pivotal shaft 18 in the clockwise direction by the chucking operation, the DC motor 19 is also pivoted in the clockwise direction from the state in FIG. 5B, a left end side G of the upper flat surface 19b of the outer surface of the body moves upward to project, and the left end side G of the flat surface 19b advances into the opening 2a of the tray 2. However, as described above, since the disk D is floated from the tray 2, a clearance is assured between the left end side G of the flat surface 19b moving upward and the lower surface of the disk D, and a recording/reproducing operation is not hindered by the contact between the disk D and the DC motor 19.

A transmission path of drive force from the DC motor 19 will be described below.

As shown in FIG. 5A, the drive force of the DC motor 19 used for tray loading and mounted on the pickup chassis 5 is transmitted from the worm gear 20 attached to the drive shaft 19a to the intermediate gear 7 supported by the support shaft 6 of the upper tray chassis 4. The drive force is transmitted from the intermediate gear 7 to the drive force transmission gear constituted by the gears 8 and the like shown in FIGS. 1 and 5.

When the pickup chassis 5 is pivoted from the open state shown in FIG. 5A to the closed state shown in FIG. 5B, since the pivotal center (shaft core of the pivotal shaft 18) of the pickup chassis 5 and the shaft core of the worm gear 20 (shaft core of the drive shaft 19a) of the DC motor 19 are set on the same line, the intermediate gear 7 meshed with the worm gear 20 is also pivoted about the shaft core of the worm gear 20. More specifically, even if the pickup chassis 5 is pivoted, the inter-shaft distance between the worm gear 20 and the intermediate gear 7 is always kept constant. Therefore, when the pickup chassis 5 is located at any position, the drive force of the DC motor 19 can be transmitted to the drive force transmission gear through the intermediate gear 7.

Initializing operation control of the elevation positioning mechanism of the pickup unit P will be described below.

FIG. 8 is a flow chart showing the initializing operation control of the elevation positioning mechanism of the pickup unit P.

This process is executed after the power supply of the CD-ROM changer is reset.

The DC motor 37 is started to move (slide) the cam plates 43 and 45 as described above, the pickup unit P is moved upward through the pins 100 (S1), a detection output from a linear position sensor (LPS) for detecting the slide position of the cam plate 43 (or 45) is loaded (S2), and it is determined whether the pickup unit P reaches the position of the fourth (uppermost) tray (S3). If the pickup unit P does not reach the position of the fourth tray (NO in S3), the flow returns to step S2 to repeat the above steps.

If the pickup unit P reaches the position of the fourth tray (YES in S3), the DC motor 37 is started at a ¼ duty factor to prevent the gears from being meshed with each other, thereby sliding the pickup cam plates 24, and the pickup unit P is moved upward (S4). The linear position sensor is loaded (S5), and it is determined whether the position of the cam plate 43 is changed (S6). If the position is changed (YES in S6), since the pins 100 have not been brought into contact with the reference surface 104, the flow returns to step S5 to repeat the above steps.

If the position is not changed (NO in S6), it is determined that the pins 100 are brought into contact with the position reference surface 104 (S7). On the basis of the detection value, the difference between the present position of the cam plate 43 and an ideal value is calculated, and a table of respective positions (target values) is updated. More specifically, assume that target values P1, P2, P3, P4, and the like are set at the play positions of the fourth, third, second, and first trays as the table of the respective positions, and that the ideal value at the reference position is set to be P0 (e.g., 10). In this case, if a detection output from the linear position sensor at the present position (position where the pins 100 are brought into contact with the position reference surface 104) is 8, 8 (present position)−10 (ideal value)=−2.

The table of the respective positions of the target values P1, P2, P3, P4, and the like is corrected by "−2" to be updated. In this manner, the initializing operation of the elevation positioning mechanism of the pickup unit P is completed.

Since the initialization is performed each time the power supply of the CD-ROM changer is turned on, the variations in precision can be corrected on the basis of the latest data.

Elevator moving (elevation) operation control will be described below.

FIG. 9 is a flow chart showing the elevator moving operation control.

The select button or the like for a CD-ROM is pushed as described above to elevate the pickup unit P to a position (target position) corresponding to a disk selected by the pickup unit P. This control operation will be described below.

The position of a play position-8LSB is set as a moving target position (S1), the DC motor 37 is normally started to slide the cam plates 43 and 45, thereby moving the pickup unit P upward (downward) toward the target position (S12). The positions of the cam plates 43 and 45 are loaded as a detection output from the linear position sensor (S13), and it is determined whether the cam plates 43 and 45 reach the target position (S14). If the cam plates do not reach the target position (NO in S14), the flow returns to S13.

If the cam plates 43 and 45 reach the target position (YES in S14), the moving target position set to the play position (S15), the DC motor 37 is slowly started upward at a ¼ duty factor (S16), the positions of the cam plates 43 and 45 are loaded by the linear position sensor (S17), and it is determined whether the cam plates 43 and 45 reach the target position 0 or +1 (S18). If the cam plates 43 and 45 do not reach the target position 0 or +1 (NO in S18), the flow returns to S17. If the cam plates 43 and 45 reach the target position 0 or +1 (YES in S18), the DC motor 37 is stopped (S19).

In general determination of a digital value, in order to avoid redundancy caused by instability of data, GO/NOGO is determined within a width of ±1 LSB or more. In this case, a determination reference can be changed into +0/−1 LSB under the control of the DC motor 19, and a blind zone can be made half.

Although the horizontal positions of the cam plates 43 and 45 are detected by the linear position sensor in the above controls, the level position of the pickup unit P may be detected by a sensor.

With the above operation control, defective level position precision caused by overrunning of elevation can be prevented even after the DC motor 37 is stopped, and the entire moving time can be prevented from being considerably shortened.

Hysteresis is generated by back-lash of the gear depending on the moving direction (upward or downward) of the pickup unit P, and an error is generated at the stop position of the pickup unit P.

In order to solve this problem, in this embodiment, when the pickup unit P is moved downward to be stopped at the position corresponding to the target value, after the pickup unit P is caused to temporarily pass through the position corresponding to the target position, the pickup unit P is moved upward to be stopped at the position corresponding to the target position.

With the above control, when the pickup unit P is moved to the lower stop position or the upper stop position, since the pickup unit P is always moved from the lower side to the upper side, the influence of hysteresis can be eliminated. Even if the hysteresis is generated, the same condition can be set, and the pickup unit P can be stopped at the same stop position.

In the embodiment described above, a recording/reproducing device, having a pickup unit P having a head mounted thereon, for selecting a desired disk D from a magazine M which accommodates a plurality of disks D therein to read/write data between the selected disk and the head, comprising: cam plates 43 and 45 which have cam grooves (46) engaged with cam pins 100 of the pickup unit P to vertically move the pickup unit P and is supported movably in a horizontal direction; a DC motor 37 for driving the cam plates 43 and 45 in the horizontal direction; a sensor S for detecting positions of the cam plates 43 and 45 in the horizontal direction; and a position reference surface 104 which is formed on at least one end portion of the cam grooves (46) and with which the cam pins 100 of the pickup unit P are brought into contact, wherein the cam plates 43 and 45 are driven in the horizontal direction by the DC motor 37, the cam pins 100 of the pickup unit P are brought into contact with the horizontal position reference surface 104, and, at this time, initialization of the cam plates is performed by causing the sensor S to detect the positions of the cam plates 43 and 45 in the horizontal direction. For this reason, without parts such as a conventional level-positioning member or the like, the positions of the cam plates 43 and 45 in the horizontal direction when the pins 100 of the pickup unit P are brought into contact with the position reference surface 104 of the cam grooves (46, 102, 103) are detected by the sensor S to be corrected, so that the level precision of the pickup unit P obtained by the cam plates 43 and 45 can be kept. In addition, the mechanism is simplified, probability of an increase in cost and probability of fault can be reduced, and a compact body can be accomplished. A projection moving operation and a push-up operation for a positioning member are not required, so that a period of time from a selecting operation to a loading operation can be shortened.

In the above embodiment, a recording/reproducing device, having a pickup unit P having a head mounted thereon, for selecting a desired disk D from a magazine M which accommodates a plurality of disks D therein to read/write data between the selected disk D and the head, comprising: cam plates 43 and 45 which have cam grooves (46, 102, 103) engaged with cam pins 100 of the pickup unit P to vertically move the pickup unit P and is supported movably in a horizontal direction; a DC motor 37 for driving the cam plates 43 and 45 in the horizontal direction; a sensor S for detecting a level position of the pickup unit P; and a position reference surface 104 which is formed on at least one end portion of the cam grooves (46) and with which the cam pins 100 of the pickup unit P are brought into contact, wherein the cam plates 43 and 45 are driven in the horizontal direction by the DC motor 37, the cam pins 100 of the pickup unit P are brought into contact with the position reference surface 104, and, at this time, initialization of the cam plates 43 and 45 is performed by causing the sensor S to detect the level position of the pickup unit P. For this reason, without parts such as a conventional level-positioning member or the like, the level position of the pickup unit P when the pins 100 of the pickup unit P are brought into contact with the position reference surface 104 of the cam grooves (46) are detected by the sensor S to be corrected, so that the level precision of the pickup unit P can be kept. In addition, the mechanism is simplified, probability of an increase in cost and probability of fault can be reduced, and a compact body can be accomplished. A conventional projection moving operation and a push-up operation for a positioning member are not required, so that a period of time from a selecting operation to a loading operation can be shortened.

In the embodiment described above, the DC motor 37 drives the cam plates 43 and 45 at a first speed until the difference between an output value from the sensor S and a target value is equal to a first predetermined value, thereafter, the DC motor 37 drives the cam plates 43 and 45 at a second speed lower then the first speed until the difference between the output value from the sensor S and the target value is equal to a second predetermined value smaller than the first predetermined value, and, thereafter, driving of the cam plates 43 and 45 is stopped when the difference between the output value from the sensor S and the target value reaches a third predetermined value smaller than the second predetermined value. For this reason, defective level position precision caused by overrunning of elevation can be prevented even after the DC motor 37 is stopped, and the entire moving time can be prevented from being considerably shortened.

In the embodiment described above, when the pickup unit P is moved downward to be stopped at a position corresponding to a target value, after the pickup unit P is temporarily caused to pass through the position corresponding to the target value, the pickup unit P is moved upward to be stopped at the position corresponding to the target value. For this reason, when the pickup unit P is moved to the lower stop position or the upper stop position, since the pickup unit P is always moved from the lower side to the upper side, the influence of hysteresis can be eliminated; or even if the hysteresis is generated, the same condition can be set, and the pickup unit P can be stopped at the same stop position.

In the embodiment described above, the cam grooves (46, 102, 103) are engaged with the cam pins 100 projecting from the pickup unit P and engaged with the cam pins 100 at the inclined portion (46) of the cam groove even at a level position where any disk D is selected. For this reason, the cam pin 100 is held at the crossing point between the longitudinal groove 101 and the inclined cam groove portion 46 by a wedge-like corner portion constituted by the inclined surface of the cam groove portion 46 and the vertical surface of the longitudinal groove 101 to make the cam pin 100 stable, thereby preventing the cam pin 100 from being horizontally vibrated.

According to the invention, without parts such as a conventional level-positioning member or the like, the positions of the cam plates in the horizontal direction when the pins of the pickup unit are brought into contact with the horizontal position reference portion of the cam grooves are detected by the sensor to be corrected, so that the level precision of the pickup unit obtained by the cam plates can be kept. In addition, the mechanism is simplified, probability of an increase in cost and probability of fault can be reduced, and a compact body can be accomplished. A projection moving operation and a push-up operation for a positioning member are not required, so that a period of time from a selecting operation to a loading operation can be shortened.

According to the invention, without parts such as a conventional level-positioning member or the like, the level position of the pickup unit when the cam pins of the pickup unit are brought into contact with the horizontal position reference portion of the cam grooves are detected by the sensor to be corrected, so that the level precision of the pickup unit can be kept. In addition, the mechanism is simplified, probability of an increase in cost and probability of fault can be reduced, and a compact body can be accomplished. A projection moving operation and a push-up operation for a positioning member are not required, so that a period of time from a selecting operation to a loading operation can be shortened.

According to the invention, defective level position precision caused by overrunning of elevation can be prevented even after the motor is stopped, and the entire moving time can be prevented from being considerably shortened.

According to the invention, when the pickup unit is moved to the lower stop position or the upper stop position, since the pickup unit is always moved from the lower side to the upper side, the influence of hysteresis can be eliminated. Even if the hysteresis is generated, the same condition can be set, and the pickup unit can be stopped at the same stop position.

According the invention, the cam pin is held at the crossing point between the longitudinal groove and the inclined cam groove portion by a wedge-like corner portion constituted by the inclined surface of the cam groove portion and the vertical surface of the longitudinal groove to make the cam pin stable, thereby preventing the cam pin from being vibrated.

What is claimed is:

1. A recording/reproducing device having a pickup unit including a head mounted thereon, the pickup unit selecting a desired disk from a magazine that accommodates a plurality of disks therein to read/write data between the selected disk and the head, the device comprising:
- a cam plate that has a cam groove engaged with a cam pin of the pickup unit such that the pickup unit is vertically moveable and is moveably supported in a horizontal direction;
- a motor for driving said cam plate in the horizontal direction;
- a sensor for detecting a position of said cam plate in the horizontal direction; and
- a horizontal cam groove portion which is formed on at least one end portion of said cam groove and with which said cam pin of said pickup unit is brought into contact,
  characterized in that said cam plate is driven in the horizontal direction by said motor, said cam pin of said pickup unit is brought into contact with said horizontal cam groove portion, and, at this time, initialization of said cam plate is performed by said sensor detecting the position of said cam plate in the horizontal direction,
  said motor drives said cam plate at a first speed in a predetermined direction until a difference between an output value from said sensor and a target value is equal to a first predetermined value,
  thereafter, the motor drives said cam plate at a second speed lower than the first speed and in the predetermined direction until the difference between the output value from said sensor and the target value is equal to a second predetermined value smaller than the first predetermined value, and
  thereafter, driving of said cam plate is stopped when the motor drives said cam plate in the predetermined direction and the difference between the output value from said sensor and the target value reaches a third predetermined value smaller than the second predetermined value.

2. A recording/reproducing device, having a pickup unit including a head mounted thereon, the pickup unit selecting a desired disk from a magazine that accommodates a plurality of disks therein to read/write data between the selected disk and the head, comprising:
- a cam plate that has a cam groove engaged with a cam pin of the pickup unit such that the pickup unit is vertically moveable and is moveably supported in a horizontal direction;
- a motor for driving said cam plate in the horizontal direction;
- a sensor for detecting a level position of said pickup unit; and
- a horizontal cam groove portion which is formed on at least one end portion of said cam groove and with which said cam pin of said pickup unit is brought into contact,
  characterized in that said cam plate is driven in the horizontal direction by said motor, said cam pin of said pickup unit is brought into contact with said cam groove portion, and, at this time, initialization of said cam plate is performed by said sensor detecting the level position of said pickup unit;
  said motor drives said cam plate at a first speed in a predetermined direction until a difference between an output value from said sensor and a target value is equal to a first predetermined value,
  thereafter, the motor drives said cam plate at a second speed lower than the first speed and in the predetermined direction until the difference between the output value from said sensor and the target value is equal to a second predetermined value smaller than the first predetermined value, and
  thereafter, driving of said cam plate is stopped when the motor drives said cam plate in the predetermined direction and the difference between the output value from said sensor and the target value reaches a third predetermined value smaller than the second predetermined value.

3. A recording/reproducing device according to claim 1, characterized in that said cam groove is engaged with said cam pin projecting from said pickup unit and engaged with said cam pin at an inclined portion of said cam groove even at a level position where any disk is selected.

4. A recording/reproducing device according to claim 2, characterized in that said cam groove is engaged with said cam pin projecting from said pickup unit and engaged with said cam pin at an inclined portion of said cam groove even at a level position where any disk is selected.

5. A recording/reproducing device having a pickup unit including a head mounted thereon, the pickup unit selecting a desired disk from a magazine that accommodates a plurality of disks therein to read/write data between the selected disk and the head, the device comprising:
- a cam plate that has a cam groove engaged with a cam pin of the pickup unit such that the pickup unit is vertically moveable and is moveably supported in a horizontal direction;
- a motor for driving said cam plate in the horizontal direction;
- a sensor for detecting a position of said cam plate in the horizontal direction; and
- a horizontal cam groove portion which is formed on at least one end portion of said cam groove and with which said cam pin of said pickup unit is brought into contact,
  characterized in that said cam plate is driven in the horizontal direction by said motor, said cam pin of said pickup unit is brought into contact with said horizontal cam groove portion, and, at this time, initialization of said cam plate is performed by said sensor detecting the position of said cam plate in the horizontal direction,
  after said initialization is performed, when said pickup unit is moved downward to be stopped at a target value corresponding to a position of a disk housed in said magazine, the pickup unit temporarily passes through the target value, which is detected by said sensor, thereafter said pickup unit is moved upward by moving said cam plate in the horizontal direction and stopped at the target value.

6. A recording/reproducing device, having a pickup unit including a head mounted thereon, the pickup unit selecting a desired disk from a magazine that accommodates a plurality of disks therein to read/write data between the selected disk and the head, comprising:
- a cam plate that has a cam groove engaged with a cam pin of the pickup unit such that the pickup unit is vertically moveable and is moveably supported in a horizontal direction;

a motor for driving said cam plate in the horizontal direction;

a sensor for detecting a level position of said pickup unit; and a horizontal cam groove portion which is formed on at least one end portion of said cam groove and with which said cam pin of said pickup unit is brought into contact, characterized in that said cam plate is driven in the horizontal direction by said motor, said cam pin of said pickup unit is brought into contact with said horizontal cam groove portion, and, at this time, initialization of said cam plate is performed by said sensor detecting the level position of said pickup unit;

after said initialization is performed, when said pickup unit is moved downward to be stopped at a target value corresponding to a position of a disk housed in said magazine, the pickup unit temporarily passes through the target value, which is detected by said sensor, thereafter said pickup unit is moved upward by moving said cam plate in the horizontal direction and stopped at the target value.

* * * * *